United States Patent [19]
Galitz

[11] 3,760,928
[45] Sept. 25, 1973

[54] COMPOUND APPLYING MACHINE

[75] Inventor: Raymond F. Galitz, La Grange Park, Ill.

[73] Assignee: Continental Can Company, Inc., New York, N.Y.

[22] Filed: Jan. 19, 1971

[21] Appl. No.: 107,643

[52] U.S. Cl. .............................. 198/19, 198/31 AC
[51] Int. Cl. ......................... B23q 5/22, B65g 47/26
[58] Field of Search................... 198/31 AC, 31 AB, 198/32, 19, 24

[56] References Cited
UNITED STATES PATENTS
3,161,004  12/1964  Muzinich .............................. 198/19

FOREIGN PATENTS OR APPLICATIONS
530,748  12/1940  Great Britain ....................... 198/32
583,151  12/1946  Great Britain ................. 198/31 AC

*Primary Examiner*—Richard E. Aegerter
*Attorney*—Diller, Brown, Ramik & Holt

[57] ABSTRACT

This disclosure relates to a machine for applying compound to container end units or closures, the machine including feed and discharge stations at 6 and 12 o'clock, respectively, compound applying stations at 4 and 8 o'clock, and inspection stations at 2 and 10 o'clock with novel oscillating means including a first oscillating member which feeds successive articles from the feed station in an alternate fashion to the compound applying stations in opposite directions along a generally circular path of article travel. A second oscillating member oscillates across one of the pair of compound applying and inspection stations to simultaneously feed an article from the compound applying station to the adjacent inspection station while an earlier inspected article is fed to the discharge station. Likewise, another oscillating member is associated with the remaining pair of compound applying and inspecting stations to likewise move an article from the compound applying station to the inspection station while an earlier inspected article is moved to the discharge station. Each pair of compound applying and inspecting stations includes means for elevating the articles away from the path of article travel to permit the return stroke of the oscillating feed member associated therewith.

22 Claims, 19 Drawing Figures

INVENTOR
RAYMOND F. GALITZ

BY Dillew, Brown, Ramik & Holt
ATTORNEYS

INVENTOR
RAYMOND F. GALITZ

BY Diller, Brown, Ramik & Hale
ATTORNEYS

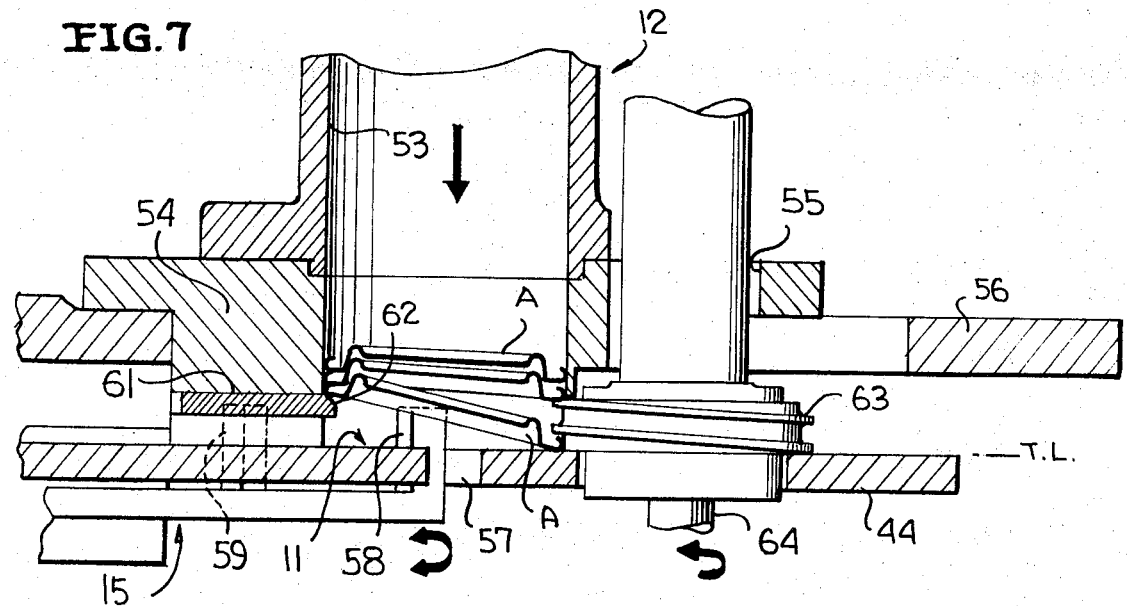
FIG.7
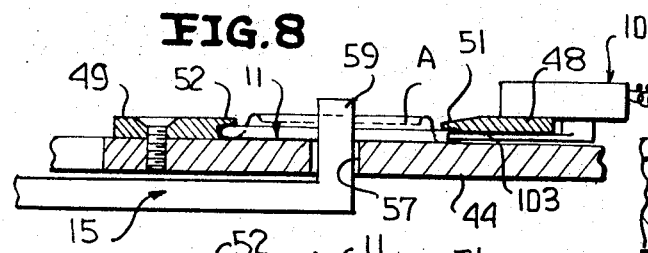
FIG.8
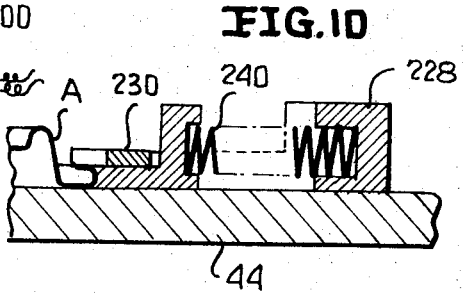
FIG.10
FIG.11
FIG.9
INVENTOR
RAYMOND F. GALITZ
ATTORNEYS

INVENTOR
RAYMOND F. GALITZ

BY *Diller, Brown, Ramik & Hall*
ATTORNEYS

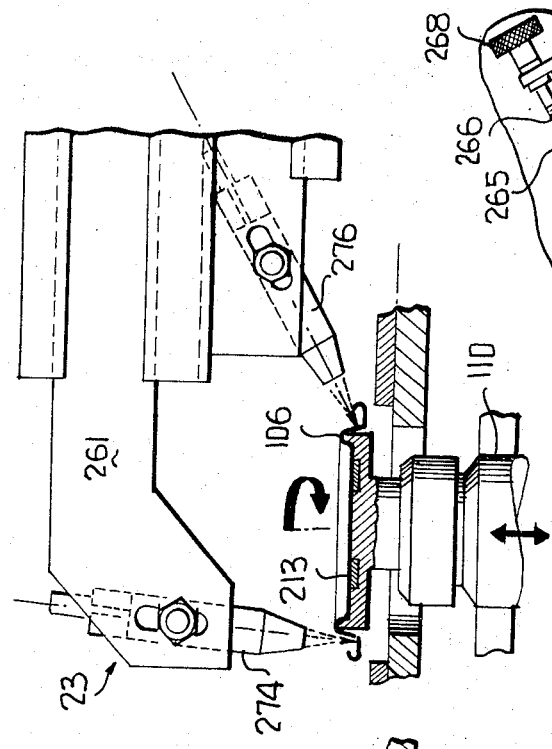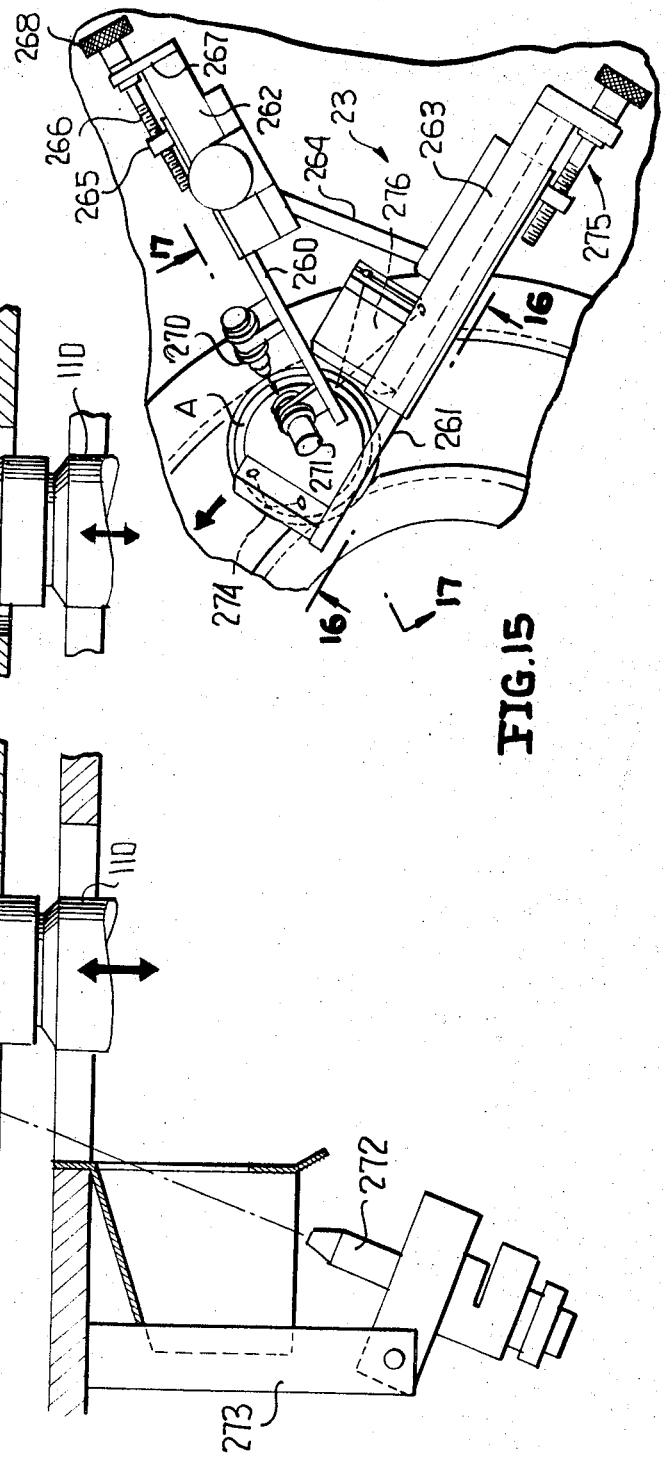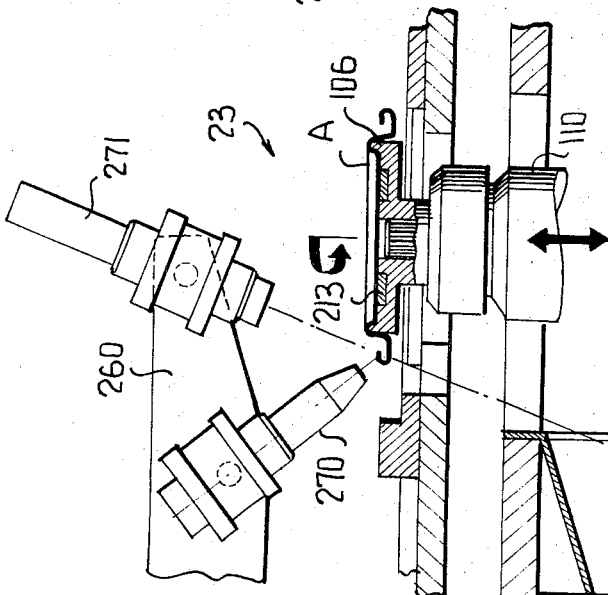

COMPOUND APPLYING MACHINE

A primary object of this invention is to provide a compound applying machine which includes as a novel portion thereof a conveying apparatus including means defining a generally circular path of article travel, means for serially feeding individual articles to the article path at a feed station thereof, means oscillating along the article path across the feed station for directing successive articles at the feed station in opposite directions along the article path toward and to an article work station between the feed station and a discharge station in both directions of article travel along the article path, and means for serially removing individual articles from the article path at the discharge station.

A further oject of this invention is to provide a novel machine of the type heretofore described wherein means are provided for elevating individual articles from and lowering individual articles to the article path at the article work stations.

Still another object of this invention is to provide a novel machine of the type immediately set forth heretofore wherein additional means are provided at each of the article work stations for rotating each article thereat when in its elevated position, and means for applying a compound to each article during the rotation thereof.

Still another object of this invention is to provide a novel machine of the type heretofore described including additional means oscillating along the article path between the feed and discharge stations in both directions of article travel for directing successive articles further toward the discharge station from each of the article work stations.

Another object of this invention is to provide a machine of the type heretofore set forth including means defining another article work station downstream of each of the first-mentioned article work stations in both directions of article travel along the article path, and additional oscillating means for directing individual articles from each first work station to the second next adjacent and downstream work station while at the same time delivering an article from the second work station to the discharge station.

A further object of this invention is to provide a novel machine of the type described including means synchronizing the movement of the oscillating means for movement thereof toward each article work station only when the elevating and lowering means thereat is in its article-lowered position.

Yet another object of this invention is to provide a novel machine of the type heretofore set forth wherein means are provided at each of the first work stations for applying dual bands of compound to the articles thereat when the same are elevated and rotating, and detection means at each of the inspection stations for determining the condition of the compound applied to the articles.

With the above and other objects in view that will hereinafter appear, the nature of the invention will be more clearly understood by reference to the following detailed description, the appended claimed subject matter, and the several views illustrated in the accompanying drawings.

In the drawings:

FIG. 1 is a top perspective view of the novel machine constructed in accordance with this invention, and illustrates feed and discharge stations at 6 and 12 o'clock, respectively, compound applying stations at 4 and 8 o'clock, detector or inspection stations at 2 and 10 o'clock, and novel oscillating means for feeding articles, such as can ends or end units, from the feed station to the discharge station.

FIGS. 2a through 2f schematically illustrate the manner in which successively fed articles at the feed station are fed in an alternate fashion in opposite directions by the oscillating means.

FIG. 7 is an enlarged fragmantary sectional view taken generally along line 7—7 of FIG. 5, and illustrates the manner in which individual articles, such as can closures or end units, are fed individually from a stack to the first of the oscillating members.

FIG. 8 is a fragmentary enlarged sectional view taken generally along line 8—8 of FIG. 5, and illustrates means for detecting the presence or absence of articles which forms part of the control syytem for the compound applying stations.

FIG. 9 is a fragmentary top plan view of one of the two identical compound applying stations, and illustrates a pair of yieldable clamping members thereat for releasably retaining each article fed thereto.

FIG. 10 is an enlarged fragmentary sectional view taken generally along line 10—10 of FIG. 9, and illustrates the manner in which one of the articles is retained in position by one of the two yieldable elements.

FIG. 11 is an enlarged fragmentary sectional view taken generally along line 11—11 of FIG. 5, and illustrates a portion of another of the oscillating members delivering an article to the inspection station downstream of the compound applying station of FIGS. 9 and 10.

FIG. 15 is a fragmentary top plan view of one of the inspection stations, and illustrates means for detecting "clips" in each end unit as well as "skips" of both compound coatings.

FIG. 16 is a fragmentary sectional view taken generally along line 16—16 of FIG. 15, and illustrates two detectors for detecting skips in the dual compound bands.

FIG. 17 is a fragmentary sectional view taken generally along line 17—17 of FIG. 15, and illustrates means for detecting the presence or absence of an end unit upon its associated holder as well as small clips thereof.

GENERAL DESCRIPTION

Figure 1:
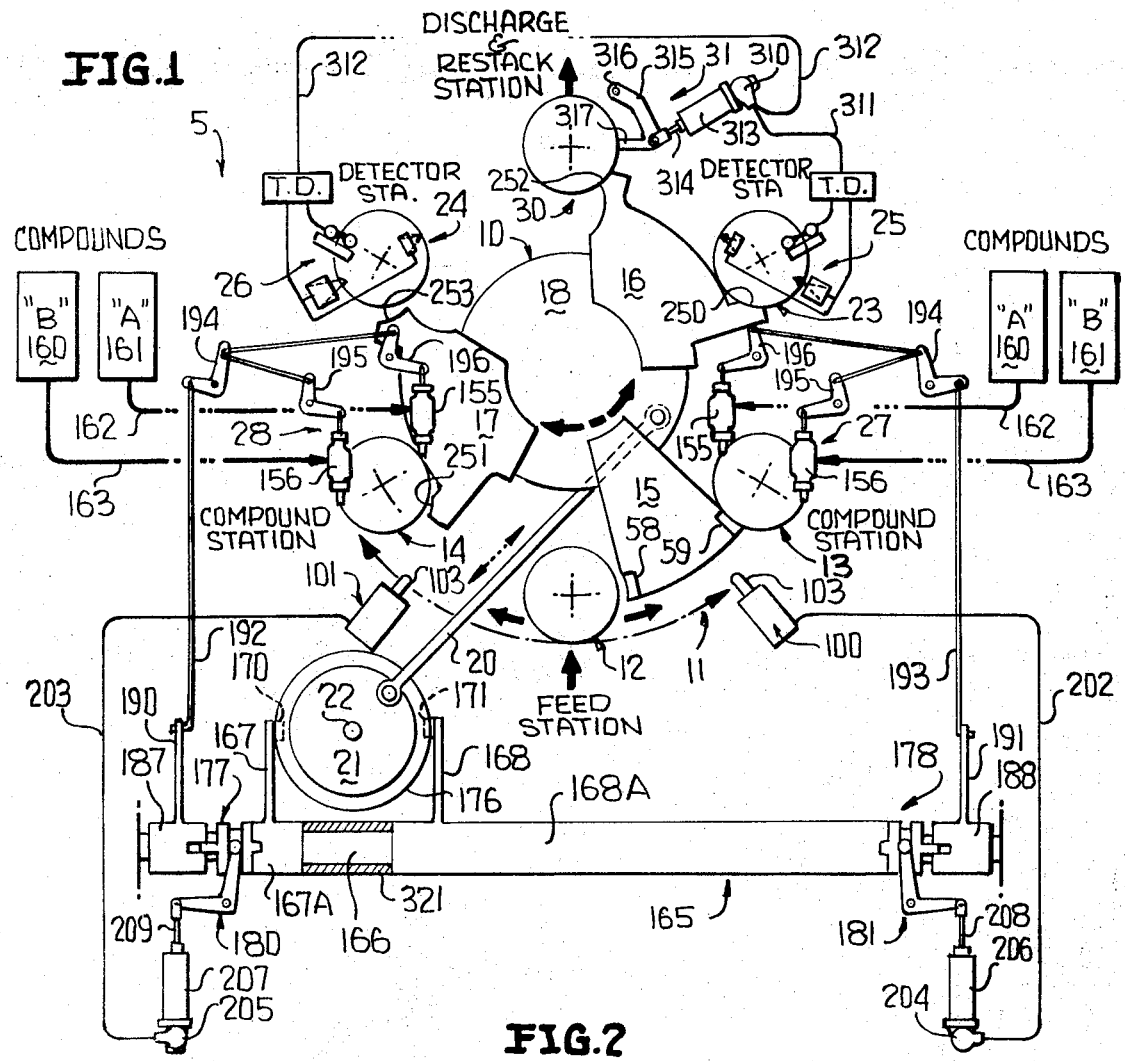

A novel machine 5 constructed in accordance with this invention is schematically illustrated in FIG. 1 and includes means 10 for oscillating along a generally circular path 11 of article travel. A feed station 12 at the 6 o'clock position feeds successive articles, such as container closures or end units, to the article path 11 for subsequent delivery to a pair of identical compound applying stations or work stations 13, 14. The oscillating means 10 includes three oscillating members 15, 16 and 17 secured to a plate 18 which is oscillated by a rod 20 pivotally connected at one end thereto while its opposite end is pivotally connected to a disc 21 rotated by a driven shaft 22. As the disc 21 rotates the oscillating means 10 moves in an alternating fashion in clockwise and counterclockwise directions with the oscillating member 15 moving along the article path 11 across the feed station 12 for directing successive articles thereat in opposite directions in an alternating fashion to the stations 13, 14.

Downstream of each of the stations 13, 14 are identical detector, inspection or second work stations 23, 24 which include identical inspection or detecting means 25, 26, respectively. After two bands of compound have been applied to the end units at the compound applying stations 13, 14 by identical compound applying means 27, 28, the oscillating member 16 moving along the article path 11 across the compound applying station 13 moves an article to the inspection station 23 while a previously inspected article thereat is moved to a discharge and/or restacking station 30. On the return or nonfeed stroke of the oscillating member 16, the oscillating member 17 moving along the article path across the compound applying station 14 moves a previously coated article thereat to the inspection station 24 while a previously inspected article at the station 24 is delivered by the oscillating means 17 to the discharge station 30. Any articles found defective are removed at the discharge station 30 prior to being restacked by ejecting means 31 responsive to the inspecting means 25, 26 at the respective inspection stations 23, 24.

Though not illustrated in FIG. 1, lifting and lowering means to be described hereinafter are provided at the stations 14, 24 and 13, 23 for lifting the articles away from the article path 11 and returning the same thereto in a synchronized manner to permit free and unobstructed oscillation of the oscillating means 10. More specifically, at the time that the oscillating means 10 is moving clockwise the elevating means at the stations 14, 24 is in its lower position to permit the oscillating member 17 to move articles thereat toward the discharge station 30 while at the same time the elevating means at the stations 13, 23 is at its elevated position to permit the unobstructed return of the oscillating member 16 to its "home" position for subsequent feed thereby. Likewise, upon counterclockwise movement of the oscillating means 10, articles at the stations 13, 23 are moved toward the discharge station 30 with the elevating and lowering means thereat being in its lowered position while the elevating and lowering means at the stations 14, 24 is at its elevated position to permit the return of the oscillating member 17 to its "home" position.

Figure 2:
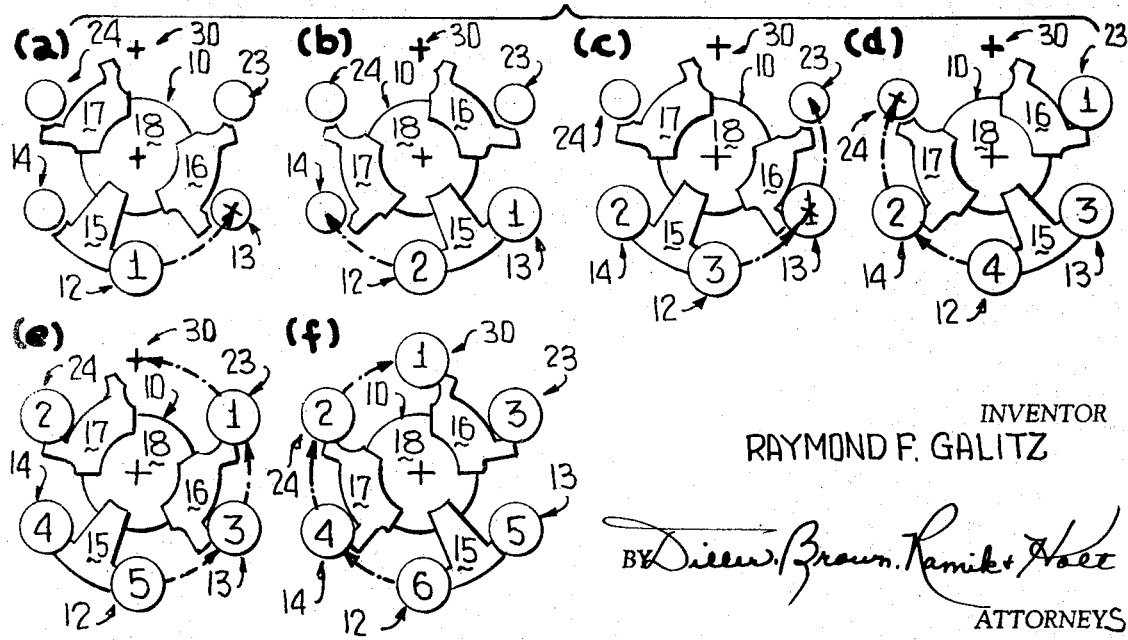

Reference is now made to FIGS. 2a through 2f of the drawings which schematically illustrate the manner in which articles 1 through 6 are advanced by the oscillating means 10, it being understood that in FIG. 2a the oscillating means 10 is in its "home" position or at its maximum point of clockwise movement. At this time an article 1 at the feed station 12 is deposited upon the article path 11 and the oscillating means 10 begins to move counterclockwise as indicated by the dashed unnumbered arrow in FIG. 2a to advance the article 1 from the feed station 12 to the compound applying station 13 during which movement the elevating means at stations 13, 23 is lowered while the elevating means at stations 14, 24 is elevated.

At the completion of the maximum counterclockwise movement of the oscillating means 10 which is shown in FIG. 2b, the article 1 is positioned at the compound applying station 13 while another article 2 is deposited at the feed station 12 upon the article path 11 incident to clockwise rotation of the oscillating means 10, as indicated by the dashed unnumbered arrow in FIG. 2b, resulting in the delivery of the article 2 along the article path 11 to the compound applying station 14. In this case during the clockwise movement of the oscillating means 10 the elevating means at the stations 13, 23 is in its elevated position to avoid interference while the elevating means at the stations 14, 24 is in its lowered position resulting in the advancement of the article 2 to station 14, as shown in FIG. 2c.

The oscillating means 10 in FIG. 2c is now in the same position as in FIG. 2a and upon counterclockwise movement the article 3 at the feed station 12 is moved along the path 11 to the compound applying station 13 by the oscillating member 15 while the article 1 which has previously been coated by the coating means 27 is moved by the oscillating member 16 from station 13 to the inspection station 23.

Upon subsequent clockwise movement of the oscillating means 10, the next article 4 at the feed station 12 is directed by the oscillating member 15 to the compound applying station 14 while the article 2 thereat which has earlier been provided with compound by the compound applying means 28 is directed by the oscillating member 17 from the compound applying station 14 to the inspection station 24.

Upon the next movement of the oscillating means 10 in a counterclockwise direction (FIG. 2e) the next article 5 at the feed station 12 is delivered to the compound applying station 13 by the oscillating member 15 while the earlier inspected and coated articles 1, 3, respectively, are advanced by the oscillating member 16 to the discharge station 30 and the inspection station 23, respectively. At this time, the next article 6 is deposited upon the article path 11 at the feed station 12 incident to clockwise movement of the oscillating means 10 with the cycle now continuing in a repetitious manner as additional articles are fed to the article path 11 at the feed station 12, Each of the articles 1 through 6, etc., is, of course, removed individually at the discharge and/or restack station 30, and those articles which are found to be defective by the inspecting means 25, 26 are ejected by the ejecting means 31 (FIG. 1) prior to the stacking operation.

SPECIFIC DESCRIPTION

The machine 5 includes a frame 35 (FIGS. 3 and 4) having a front 36, a rear 37, and a pair of sides 38, 39 defined by a number of vertical plates (unnumbered) to which are secured by welding or the like an uppermost plate 41, an intermediate plate 42 and a lowermost plate 43 (FIG. 3) which are appropriately apertured to provide access openings for drive shafts, linkages and similar drive mechanisms. A generally annular plate 44 (FIG. 6) having a centermost circular opening 45 and an outermost peripheral edge 46 is supported atop and in spaced relationship to the plate 41 by spacers 47. Two additional annular plates or rings 48, 49 having respective inwardly directed and outwardly directed flanges 51, 52 are welded to the plate 44 and define therebetween the generally circular path 11 of article travel. It is upon the path 11 that successive articles A are deposited or delivered at the feed station 12 by a mechanism which will be described immediately hereinafter.

Figure 3:
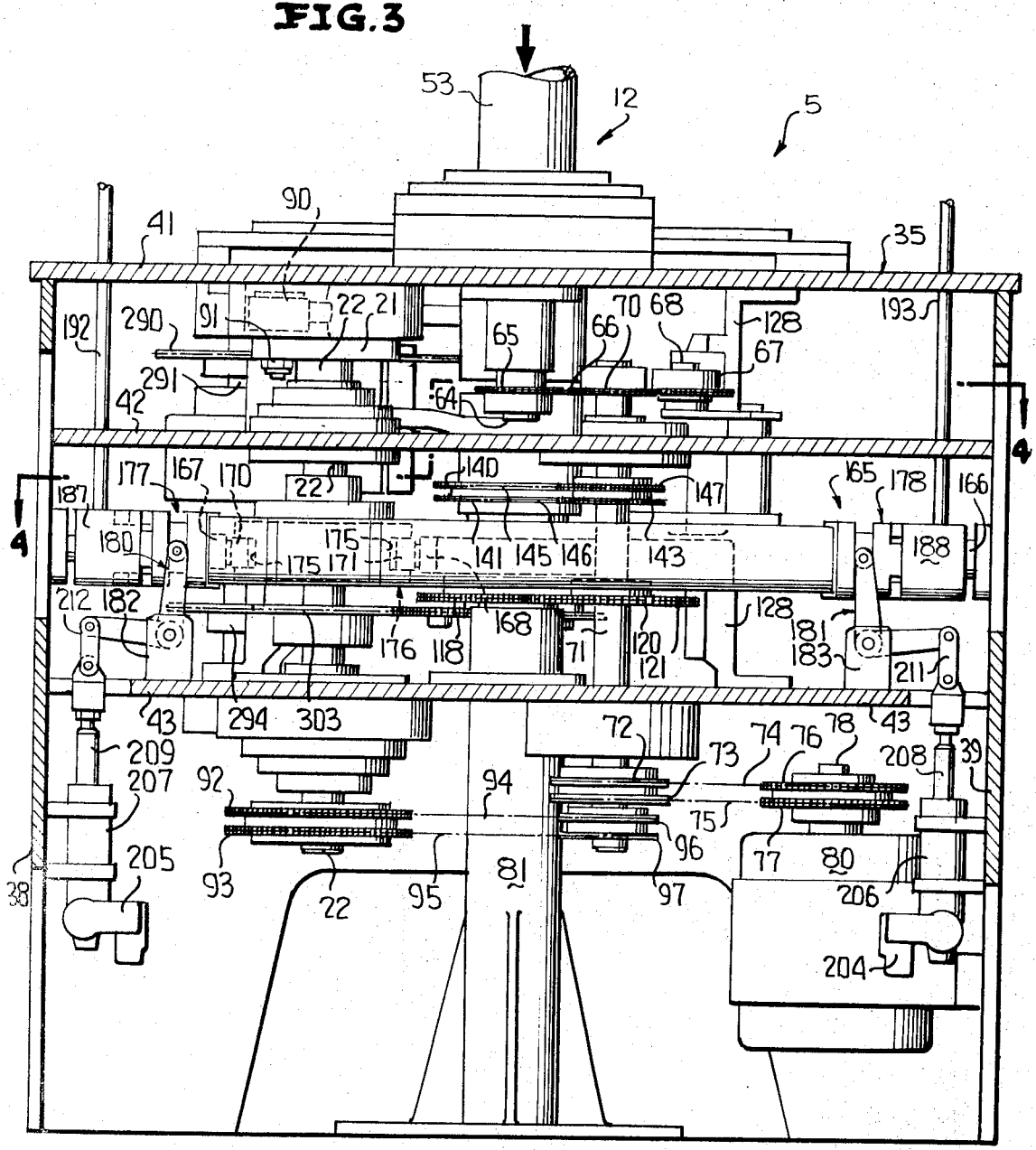
FIG. 3 is a fragmentary sectional view taken generally along line 3—3 of FIG. 4, and illustrates many of the drive mechanisms of the machine, as well as control means for activating compound applying nozzles.
Figure 5:
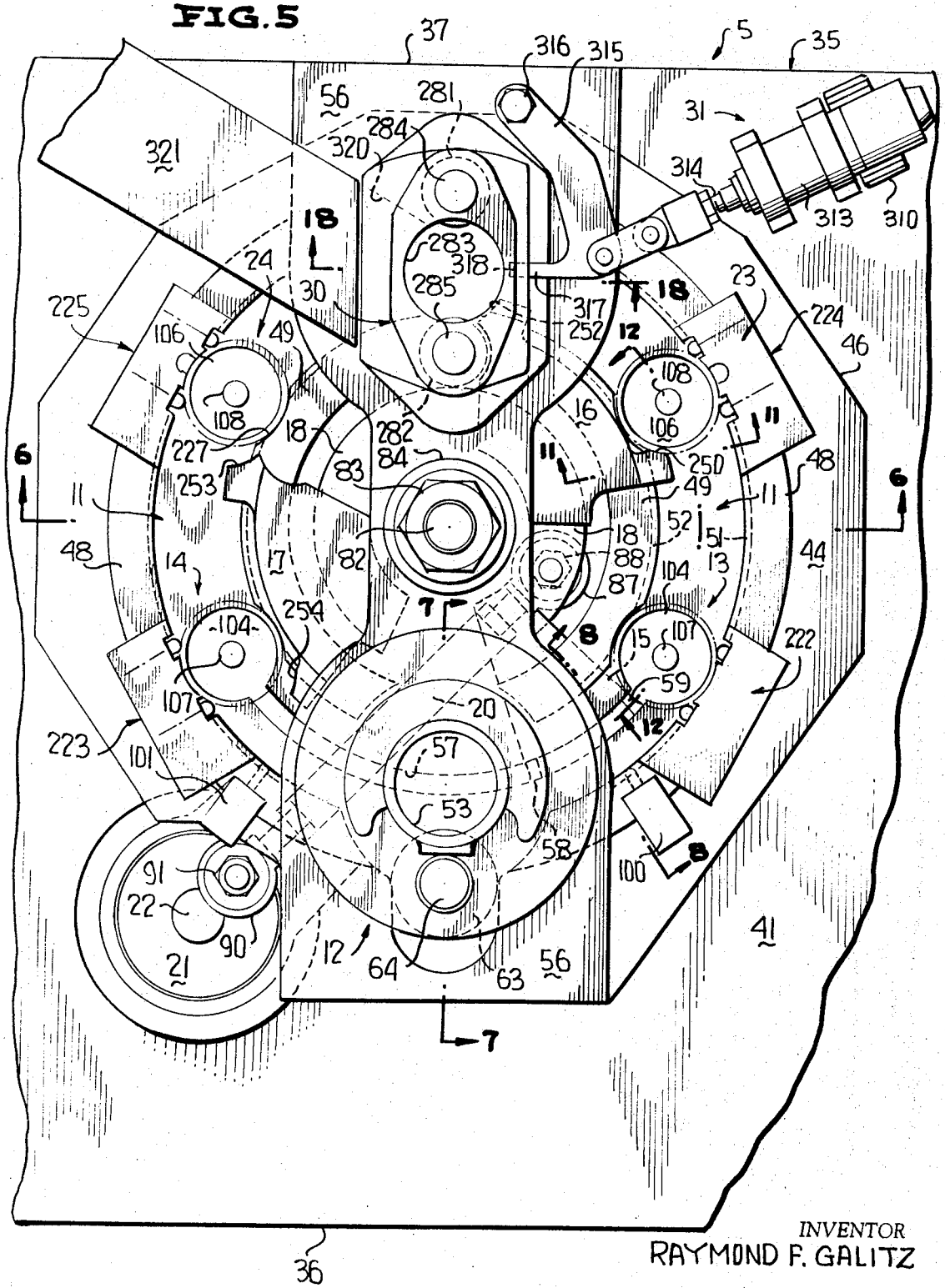
FIG. 5 is a top plan view of the machine, and illustrates details of the various stations as well as an ejecting mechanism at the discharge station responsive to detecting means at the inspection stations.

Referring particularly to FIGS. 3, 5 and 7, the feed station 12 includes a tubular hopper 53 welded to a plate 54 (FIG. 7) having an aperture 55 with the plate 54 being in turn welded to a plate 56 which spans the plate 44 (FIG. 5) and is secured to the frame 35 by vertical plates (not shown) at opposite ends of the plate 56. In this manner the hopper 53 is supported in spaced relationship above the article path 11, in the manner best illustrated in FIG. 7. Referring specifically to FIG. 7, the hopper 53 is in alignment with a portion of the article path 11 which includes an arcuate slot 57 in the plate 44 in which oscillates a pair of upstanding fingers 58, 59 of the oscillating member 15 for removing each lowermost article A and delivering the same to the compound applying stations 14, 13, respectively, in an alternate fashion. However, before the lowermost article A can be removed from the hopper 53, it must be separated from the remaining stacked articles and this is accomplished by a finger 61 (FIG. 7) welded to the underside of the plate 54 and having a tapered surface 62 upon which rests one edge of the lowermost article A while a diametrically opposite edge thereof is fed downwardly by a feed screw 63. As each article is positioned in the manner shown by the lowermost article A in FIG. 7 sufficient clearance is provided between the lowermost article and the next uppermost adjacent article to permit either of these fingers 58, 59 to push the lowermost article off the surface 62 of the finger 61 and onto the article path 11 for delivery to the compound applying stations 13, 14.

The feed screw 63 is keyed to a shaft 64 which is appropriately journalled in the frame 35 and includes at its lower end a sprocket 65 (FIG. 3) located between the plates 41, 42. A timing chain 66 (FIG. 4) is entrained about the sprocket 65, and idler sprocket 67 keyed to a shaft 68 journalled in the frame 35 and a sprocket 70 keyed to a shaft 71. The shaft 71 is appropriately journalled for rotation in the frame 35 and has keyed to its lowermost end a pair of sprockets 72, 73. Respective timing chains 74, 75 are entrained about the sprockets 72, 73 and about respective sprockets 76, 77 keyed to a shaft 78 of an electric motor 80. Upon the energizing of the motor 80 and the rotation of the shaft 78 thereof the feed screw 63 is rotated in a continuous manner through the drive chain just described to continuously feed each lowermost article A from the hopper 53 for subsequent movement along the path 11 by the fingers 58, 59 of the oscillating member 15.

The motor 80 also drives the oscillating means 10, and in this regard reference is made to FIGS. 3 through 6 which illustrate a fixed shaft 81 positioned substantially centrally of the framework 35 having a reduced upper end portion 82 (FIG. 6) which is fixed by a nut 83 to an enlarged hub 84 welded to the reduced portion of the plate 56. The circular disc or plate 18 of the oscillating means 10 lies in the plane of the uppermost plate 41 (FIG. 6) and includes a hub 85 internally of which are bearings 86 mounting the plate 18 for oscillatory movement about the fixed shaft 81. A hub 87 (FIG. 5) is secured to the underside of the plate 18 and has pivotally connected thereto by a conventional threaded bolt and nut combination 88 the rod 20 which is at its opposite end likewise connected to a hub 90 fixed to the disc 21 by a threaded nut and bolt combination 91. The shaft 22 is suitably journalled in the plates 42, 43 (FIG. 3) and at a lower end (unnumbered) thereof is keyed a pair of timing sprockets 92, 93. A pair of timing chains 94, 95 are entrained about the respective sprockets 92, 93 and about a pair of timing sprockets 96, 97 keyed to the shaft 71 which is driven from the motor 80 by the sprockets 72, 73, 76, 77 and the timing chains 74, 75. Thus, as the sprockets 76, 77 rotate the rotational movement imparted to the shaft 22 is transformed into oscillatory movement of the oscillating means 10 and the oscillating members 15, 16 and 17 carried thereby. Thus, as each lowermost article A is fed to the article path 11 in the manner described relative to FIG. 7, the oscillatory motion of the oscillating means 10 directs the articles toward the stations 13, 14 by the pushing fingers 58, 59 of the oscillating member 15.

As each article A is moved from the feed station 12 toward the compound applying stations 13, 14, the articles pass respective article-detecting means 100, 101 (FIGS. 1 and 8). The detecting means 100, 101 are identical, and each includes a pivotally mounted switch arm 103 (FIG. 8) which normally projects into the path 11 beneath the flange 51 of the plate 48. Thus, as each article is pushed past its associated detector 100, 101, the switch arm 103 is pivoted to close a conventional circuit having a conventional time delay to energize the compound applying means 27, 28 after a predetermined time period, as will be described more fully hereafter. However, if an article is not detected due to its absence, and thus the inability of the arm 103 to pivot and close the circuit, no energization of the coating means 27, 28 will take place.

Figure 6:
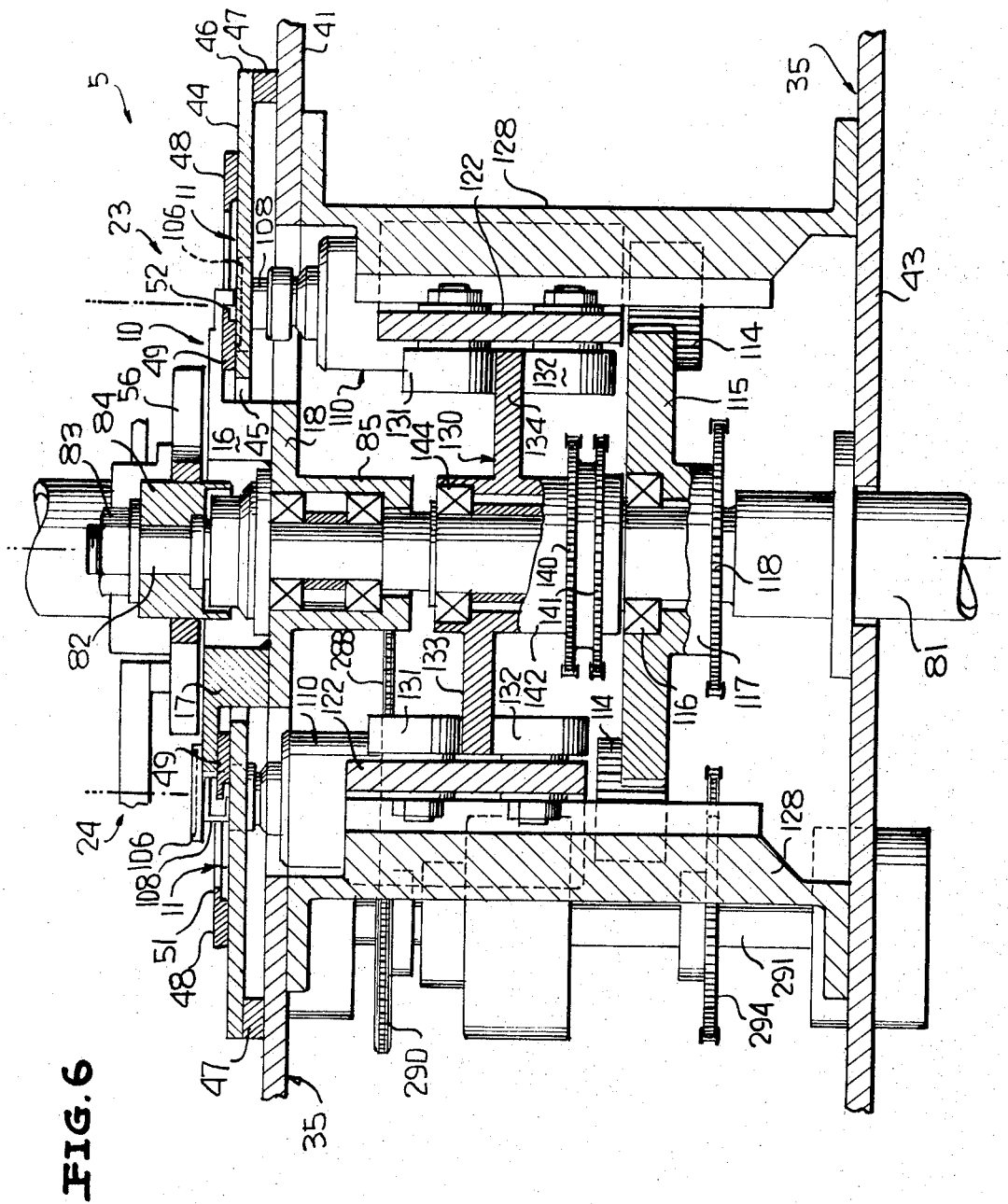
FIG. 6 is a fragmentary sectional view taken generally along line 6—6 of FIG. 5, and more clearly illustrates the manner in which the elevating and lowering mechanisms are operated in a cyclical fashion by cam and cam follower means.
Figure 12:
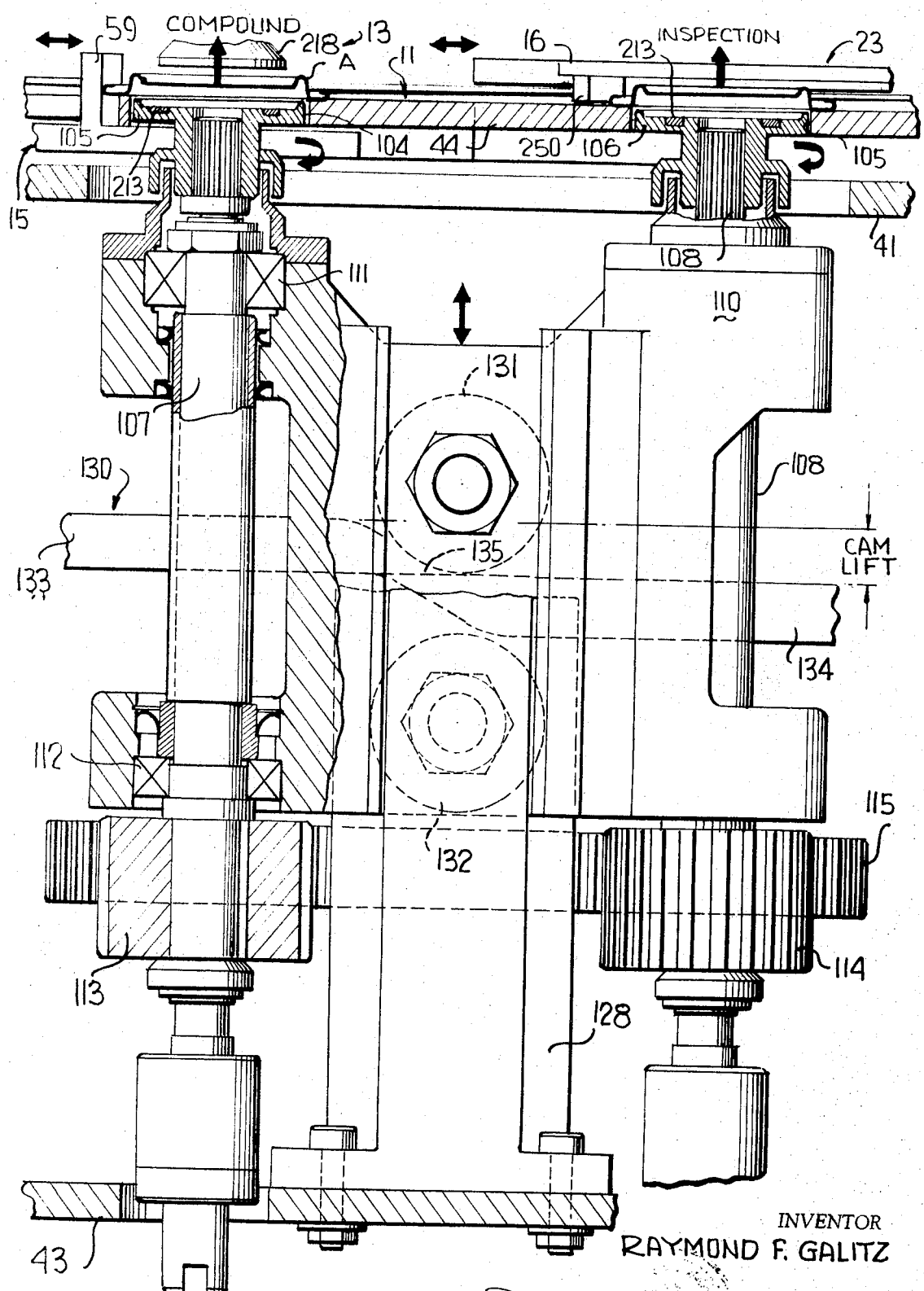
FIG. 12 is an enlarged fragmentary sectional view taken generally along line 12—12 of FIG. 5, and illustrates one of the pair of elevating and lowering means, and more specifically illustrates the cam and cam follower means for operating the same and a gear drive for rotating the articles at the compound applying and inspection stations when in the elevated position thereof.

Since the compound applying stations 13, 14 are of an identical construction, as are the inspection stations 23, 24, the following description of the stations 13, 23 will suffice for a complete understanding of the stations 14, 24. Referring particularly to FIGS. 4 through 6 and 12 of the drawings, the compound applying station 13 includes an article support head 104 normally seated in a recess 105 of the plate 44 whose upper surface defines the article path 11, while the inspection station 23 likewise includes a similar head 106 normally seated in a recess 105 of the plate 44. The heads 104, 106 are fixed to shafts 107, 108, respectively, which are in turn journalled for rotation in a common vertically reciprocal carrier or carriage 110 by bearings 111, 112 (FIG. 12). Gears 113, 114 are splined to the lower ends (unnumbered) of the respective shafts 107, 108 and these gears are in mesh with a gear 115 which is freely mounted for rotation about the shaft 81 by bearings 116 (FIG. 6). A hub 117 of the gear 115 includes a timing sprocket 118 about which is entrained a timing chain 120. The timing chain 120 is also entrained about a sprocket 121 (FIGS. 3 and 4) keyed to the shaft 71. Inasmuch as the shaft 71 is continually rotated during the energization of the motor 80, the timing sprocket 118 and the gear 115 thereof is likewise continuously rotated to continually rotate the heads 104, 106 which is necessary during both the application of compound to the articles A and the inspection thereof.

Figure 4:
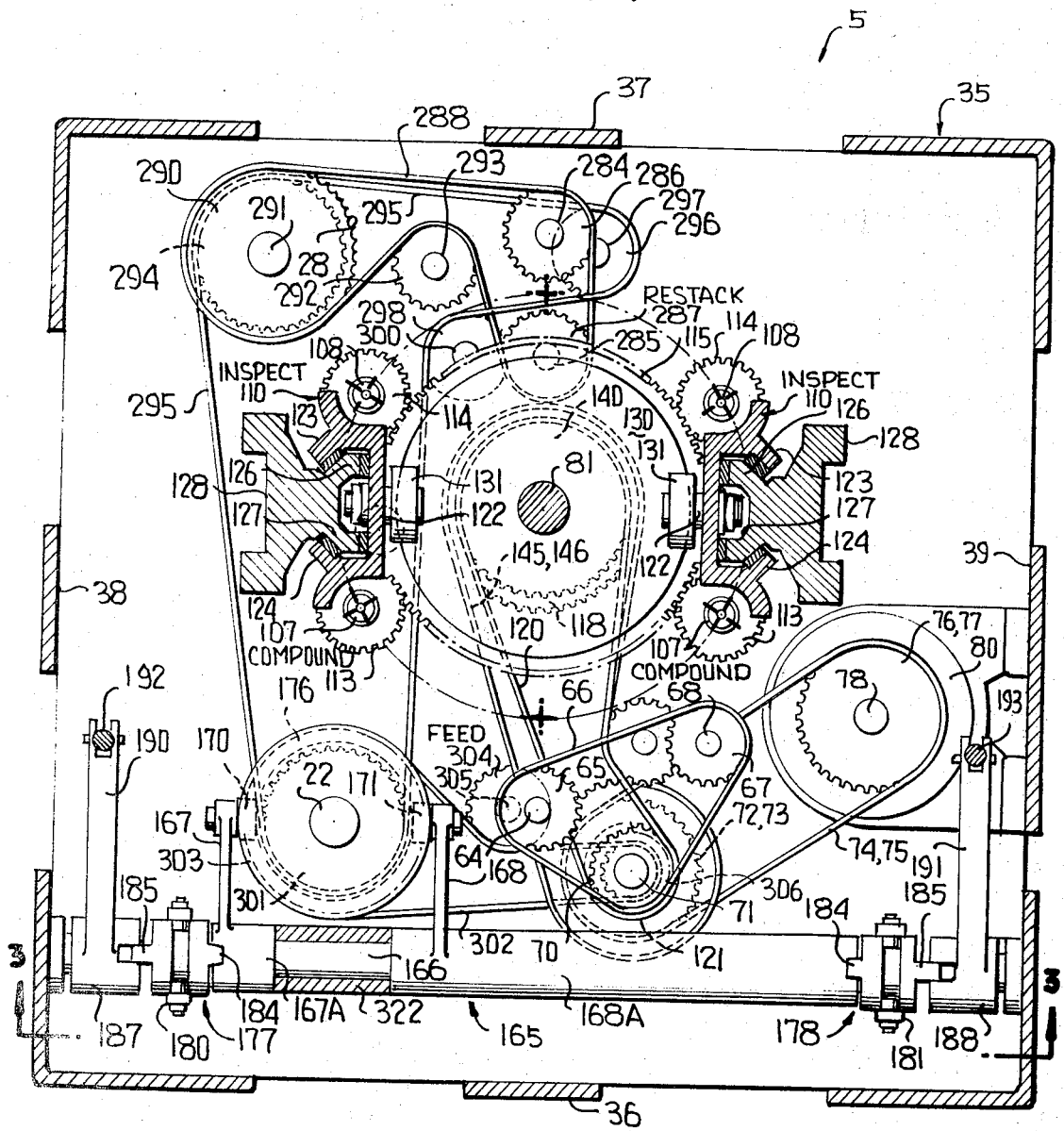
FIG. 4 is a sectional view taken generally along line 4—4 of FIG. 3 and further illustrates the drive means of the machine including a pair of elevating and lowering mechanisms for removing articles from and returning articles to the article path at each of the two compound applying and inspection stations.

The carriage 110 includes a bight portion 122 and a pair of arms 123, 124 which form a vertically disposed guide channel (unnumbered) partially surrounding a pair of vertical arms 126, 127 of a vertical support 128 fixed between the plates 41, 43 (FIG. 6). Suitable antifriction pads (unnumbered) are illustrated in FIG. 4 to reduce friction between the arms 126, 127 and the carriage 110 as the same is reciprocated vertically by a cam 130 and upper and lower cam followers or rollers 131, 132. The cam 130 has a high side 133 (FIG. 12), a low side 134, and diametrically opposite inclined or lift portions 135. As viewed in FIG. 12, the cam 130 moves from left-to-right and upon so doing the followers 131, 132 ride upon the lift portion 135 progressively raising the carriage 110 until the heads 104, 106 contact and elevate articles A positioned thereabove. However, it is to be noted that during the upward movement of the carriage 110 just described at the stations 13, 23, the identical carriage at the diametrically opposite side of the machine associated with the stations 14, 24 is progressively lowered, and this alternate lifting and lowering at the stations 13, 23 and 14, 24 is continued in a synchronized manner with the oscillations of the oscillating means 10 in a manner which will be described more fully hereinafter to prevent interference as the oscillating members 16, 17 return to their "home" positions.

The rotation of the cam 130 and thus the elevating and lowering of the heads 104, 106 is accomplished by a pair of sprockets 140, 141 which are fixed to a hub 142 of the cam 130, as is best illustrated in FIG. 6 of the drawings. Suitable bearings 144 mount the cam 130 for free relative rotation about the shaft 81. Timing chains 145, 146 are entrained about the respective timing sprockets 140, 141 and about timing sprockets 147, 148 (FIG. 3) keyed to the shaft 71 which is rotated continuously during the energization of the motor 80. In this manner the cam 130 is continually rotated to lift and lower the carriages in an alternating fashion, as is best illustrated in FIG. 6.

Figure 13:
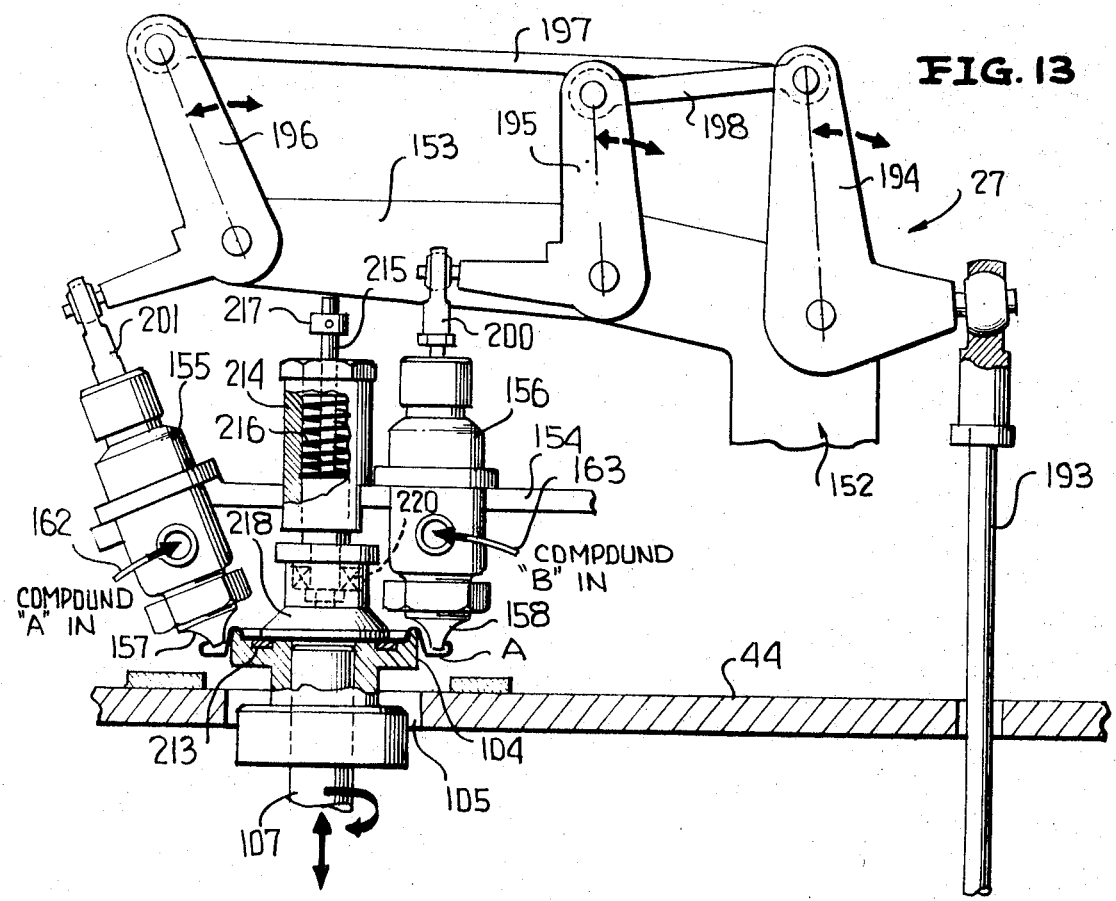
FIG. 13 is a fragmentary side elevational view partly in cross section of one of two identical pair of compound applying mechanisms, and illustrates the alignment of two nozzles relative to an article held in elevated and rotating position at one of the compound applying stations.
Figure 14:
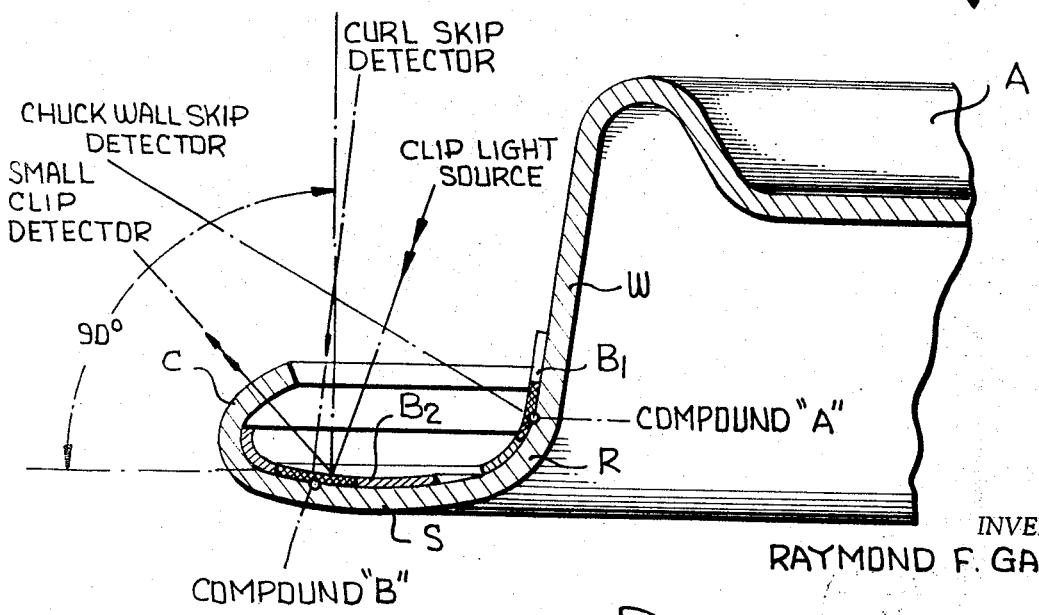
FIG. 14 is a highly enlarged fragmentary sectional view of an article coated by the machine of this invention which in this case is a container closure or end unit, and illustrates the manner in which dual bands of compound material are applied to the end unit, as well as the manner in which the same is inspected at each of the inspection stations.

Before describing the mechanisms at the compound applying station 13 which are, of course, identical to those at the compound applying station 14, reference is made to FIG. 14 of the drawings which illustrates one of the articles A as being a metallic can end or end unit which is preferably though not necessarily constructed from magnetically attractive metallic material. The can end A of FIG. 14 is of a conventional construction and includes a curl C, a seaming panel S, a seaming panel radius R, and a chuck wall W. At the compound applying stations 13, 14 dual bands B1, B2 of two different compounds (compound A, compound B, respectively) are applied to the surfaces indicated and in this regard reference is now made to FIGS. 1, 3 and 13 of the drawings.

Since the compound applying mechanisms 27, 28 are identical, the compound applying mechanism 27 will be described, and the same includes a suitable vertical support 152 (FIG. 13) forming a portion of the frame 35 and having a horizontally disposed arm 153 in generally overlying relationship to the compound applying station 13 and more specifically the head 104 of the carriage 110. Another portion 154 of the bracket 152 supports a pair of conventional compound dispensing units 155, 156 in a position such that the respective nozzles 157, 158 will apply the respective compounds B1, B2 to each of the articles A in the manner shown in FIG. 14 of the drawings. The nozzle units 155, 156 include conventional normally spring biased closed valves which normally cut off fluid communication between the nozzles 155, 156 and pressurized sources 160, 161 (FIG. 1) of the compounds A and B which are in fluid communication with the nozzle units 155, 156 through conduits 162, 163, respectively.

The control mechanism or means for opening the valves of the nozzle units 155, 156 at both of the compound applying stations 27, 28 is generally designated by the reference numeral 165 (FIGS. 1, 3 and 4), and includes a horizontally disposed stationary shaft 166 suitably mounted in frame 35. On shaft 166 are mounted hubs 167A, 168A suitably spaced by spacer 321 and free to oscillate. Integral with the hubs are respective arms 167, 168 carrying cam followers 170, 171 which engage cam track 175 of barrel cam 176 keyed to the shaft 22 which, as was heretofore described, rotates in a continuous fashion during the energization of the motor 80. Thus as shaft 22 rotates the barrel cam 176 rotates to oscillate the arms 167, 168 and associated hubs alternately, each upwardly and downwardly as viewed in FIGS. 1, 3 and 4 of the drawings.

A pair of clutches 177, 178 and hubs 187, 188 are also mounted on shaft 166 for pivotal movement. The clutches 177, 178 have axial opposite clutch faces in the form of tongues 184, 185 which are adapted to mate with grooves (unnumbered) in axial ends of hubs 167A, 168A, 187, 188. Integral with hubs 187, 188 are respective arms 190, 191 which are pivotally connected to respective rods 192, 193, connected to the respective compound applying mechanisms 28, 27 by a plurality of bellcrank levers 194, 195, and 196 (FIG. 13) pivotally connected to the bracket 152. A link 197 is connected between arms of the bellcrank levers 194, 196 while a similar link 198 is pivotally connected between the bellcrank levers 194, 195. The remaining to arms (unnumbered) of the bellcranks 195, 196 are pivotally connected to rods 200, 201, respectively, which are in turn connected to the valves of the nozzle units 155, 156. Therefore, the compounds will be dispensed from the nozzles 157, 158 when the valves of the nozzle units 155, 156 have been opened by downward movement of the rods 193, while upward movement of the rods 193 will close the valves and thus terminate the dispensing of the compounds.

The movement of the rods 192, 193 is controlled by the sensing means 100, 101 (FIG. 1) heretofore described by conducting an impulse after a suitable time delay over conductors 202, 203 (FIG. 1) to respective servo valves 204, 205 (FIG. 3). The servo valves 204, 205 open when energized to introduce fluid pressure from a suitable source (not shown) into the piston end of respective cylinders 206, 207 to raise the piston rods 208, 209 thereof upwardly which through connecting linkages 211, 212 pivot the crank arms 180, 181 to shift clutches 177, 178 to engagement with respective hubs 167A, 168A. Crank arms 180, 181 are pivotally mounted to plate 43 by means of brackets 182, 183 respectively. The clutches are continuously engaged with hubs 187, 188, and whenever time delay signals are received from the detecting means 101, 100, the clutches are caused to also engage respective hubs 187, 188 and thereby will activate the respective compound applying mechanisms 155, 156 to apply the compounds A and B to the articles A when in the elevated position thereof upon the heads 104, as shown in FIG. 13.

Since the compounds must be applied relatively accurately in the dual bands B1, B2, each article A must be held motionless upon its associated head 104 though rotating therewith, and for this purpose the heads 104 (and 106) are provided with magnets 213 or equivalent hold-down means in the event the articles A are not constructed from magnetically attractable material. Moreover, between the nozzle units 155, 156 is located a housing 214 carrying a reciprocal rod 215 which is normally biased downwardly by a spring 216 with the lowermost position of the rod 215 being limited by a stop nut 217 carried thereby. The lower end portion of the rod 215 carries a hold-down head 218 rotatably journalled upon the rod 215 by conventional bearings 220. Thus, as each carriage 110 is elevated, the heads 104 and the hold-down heads 218 function to firmly clamp the articles A therebetween in conjunction with the magnets 213 to prevent undesired rotation of the articles A during the coating operation, and though not illustrated, like hold-down means comparable to the hold-down head 218 may be provided at the inspection stations 23, 24.

Reference is now made to FIG. 5 which illustrates four identical yieldable holding means 222 through 225 associated with respective stations 13, 14, 23 and 24 which cooperate with the motion of the oscillating means 10 as well as the elevating and lowering of the carriages 110. Since the yieldable retaining means 222 through 225 are identical, reference is made only to the yieldable retaining means 222 of FIGS. 9 and 10. In the area of the article retaining means 222 the flanges 51, 52 are cut away by shallow arcs 226, 227, respectively, having an effective diameter greater than that of the articles A. Thus, when an article A is located in the article path 11 adjacent the arcs or cut-outs 226, 227, the same can be freely lifted out of the path or track 11 and returned thereto. However, the means 222 is provided to assure that each of the articles A is held stationary and is axially located relative to the underlying head to preclude jamming which might otherwise occur due to vibrations which would shift the articles A and cause the same to become misaligned with the cut-outs 226, 227 and the underlying heads 104 (or 106).

The means 222 includes a generally L-shaped plate having an upstanding leg 228 and a horizontal leg 230, the former of which is provided with two horizontal threaded bores 231, 232 in which are threaded respective bolts 233, 234. A pair of arms 235, 236 are pivoted to the base 230 by respective pivot pins 237, 238 with the arms 235, 236 including legs 240, 241 received in respective recesses 242, 243 and respective rounded noses 244, 245 projecting radially inwardly into the article path 11. Respective springs 246, 247 normally bias the arms 235, 236 in a counterclockwise direction as viewed in FIG. 9 to urge the noses outwardly into the article path 11.

As an article A is advanced to any one of the stations 13, 23, 14 or 24, the nose 245 of the upstream pivot arm 236 is contacted by the article and is moved inwardly or pivoted clockwise as viewed in FIG. 9 against the bias of the spring 247 until such time as it is axially located with respect to the underlying head 104 or 106 at which time both springs 246, 247 maintain the axial alignment of the article A. The article can then be elevated out of the path 11 by either of the heads 104, 106, and when lowered back to the path 11 after the compound has been applied thereto or an inspection operation has been completed, the spring 246 compresses to permit the re-entry of the article A to its original position upon the track 11 for subsequent movement beyond the respective stations 13, 14, 23 and 24.

Once the compounds have been applied to an article at either of the stations 13, 14, the respective oscillating members 16, 17 thereat advance each article along the article path toward the respective inspection stations 23, 24 by means of respective fingers 250, 251 of the oscillating members 16, 17 (FIGS. 1 and 11) while at the same time previously inspected articles are alternately advanced to the discharge station 30 by like fingers 252, 253 of the oscillating members 16, 17, respectively. It is to be noted that the fingers 250 through 253 project downwardly into the article path or track 11 (FIG. 11) as opposed to being directed upwardly through slots, as in the case of the fingers 58, 59 of the oscillating member 15.

Once an article has been positioned in alignment with either of the heads 106 of the inspecting stations 23, 24 and the same have been elevated in the manner heretofore described each article is inspected for the completeness of the band B1 of the compound A (FIG. 14), the completeness of the band B2 of the compound B, and the presence or absence of "clips" along the edge of the curl C. If for some reason there is a "skip" in either of the bands B1, B2 or clips in the curl C the end A is unsuited for subsequent double seaming to an associated container body. "Clips" merely means irregularities in the terminal edge of the curl C such as notches, tears or the like which would preclude the subsequent formation of a commercially acceptable double seam, as would skips in the compound bands B1, B2 which would result in "leakers".

Referring specifically to FIGS. 15 through 17 which illustrate the inspection or detector station 23, which is identical to the inspection station 24, a pair of brackets or arms 260, 261 are mounted for adjustable horizontal sliding movement in respective channels 262, 263 which are in turn connected to a vertical plate 264 secured to the frame 35. The arm 260 includes a leg 265 having a threaded bore (unnumbered) which receives an adjusting screw 266 whose opposite end is freely journalled in an arm 267 and carries a knob 268. Upon rotation of the knob 268 in either clockwise or counterclockwise directions, the arm 260 is moved radially inwardly or outwardly relative to the head 106 at the inspection station to vary the position of a detector 270 and a light source 271 carried thereby. Another detector 272 is suitably adjustably mounted upon a bracket 273 in alignment with the light source 271. The purpose of the detector 272 is to determine the presence or absence of an article A upon the head 106 and through conventional circuitry (not shown) institute a go or no-go condition of the remaining detectors. That is, in the absence of an article A upon the head 106, the light beam from the light source 271 would impinge upon the photoelectrically sensitive detector 272 to hold the detecting circuit (not shown) open so that subsequent detection by the remaining detectors in no way affects the ejecting mechanism 31. However, the presence of an article A upon the head 106 cuts off the light beam from the light source 271 and the go condition of the detecting circuit is established. Moreover, the light from the light source 271 is directed toward the seaming panel S (FIG. 14) at such an angle as to be reflected therefrom along the edge of the curl C which normally prevents the reflected light from reaching the "clip" detector 270. However, in the case of cracks, fissures, or other irregularities in the terminal portion of the curl C, the reflected light is detected by the detector 270 which signals that the article is defective and through a subsequent time delay energizes the ejector mechanism 31, as will be described more fully hereinafter.

The arm 261 carries a curl "skip" detector 274 which is adjustably mounted thereon in a conventional manner with the arm being also adjusted horizontally by a conventional mechanism 275 similar to that heretofore described relative to the arm 260. The channel 263 carries a chuck wall "skip" detector 276 which is likewise adjustably secured thereto. The curl skip detector 274 is positioned slightly less than normal to the band B2 of the compound B (FIG. 14), and in the absence of skips or omissions in the band the ejecting means 31 is not energized while the presence of such skips in the band B2 which is indicated by a variation in the reflectivity generates a time delayed signal for energizing the ejector mechanism 31. The chuck wall skip detector 276 functions in a like manner to direct an impulse to the ejection mechanism 31 if skips or voids are detected in the band B1 (FIG. 14) of compound A.

Figure 18:
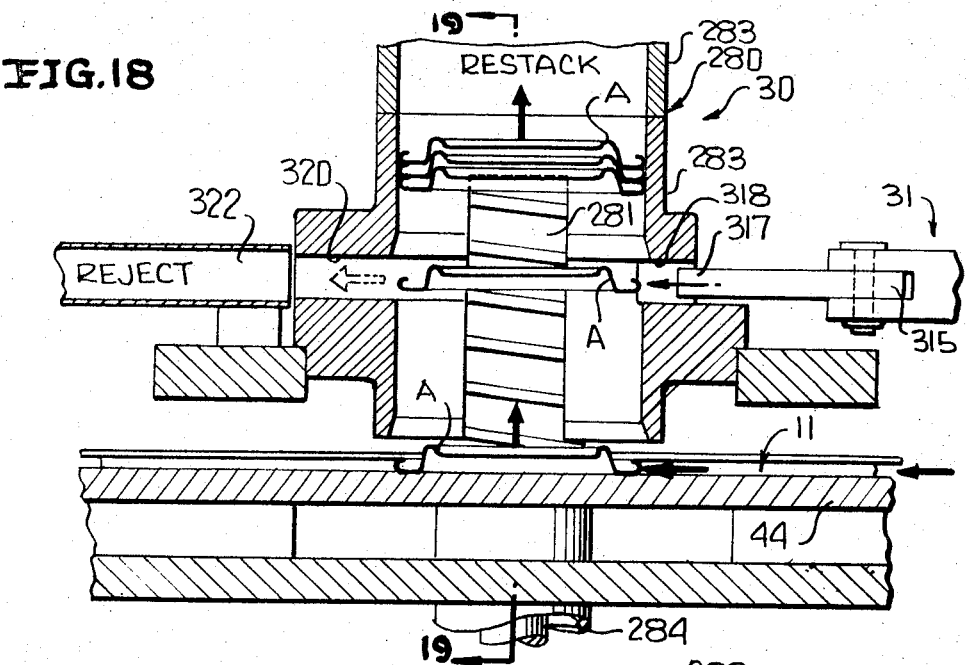
FIG. 18 is a fragmentary enlarged sectional view taken generally along line 18—18 of FIG. 5, and illustrates the manner in which articles are removed from the path of travel and are restacked thereafter with defective articles being ejected prior to the restacking operation.
Figure 19:
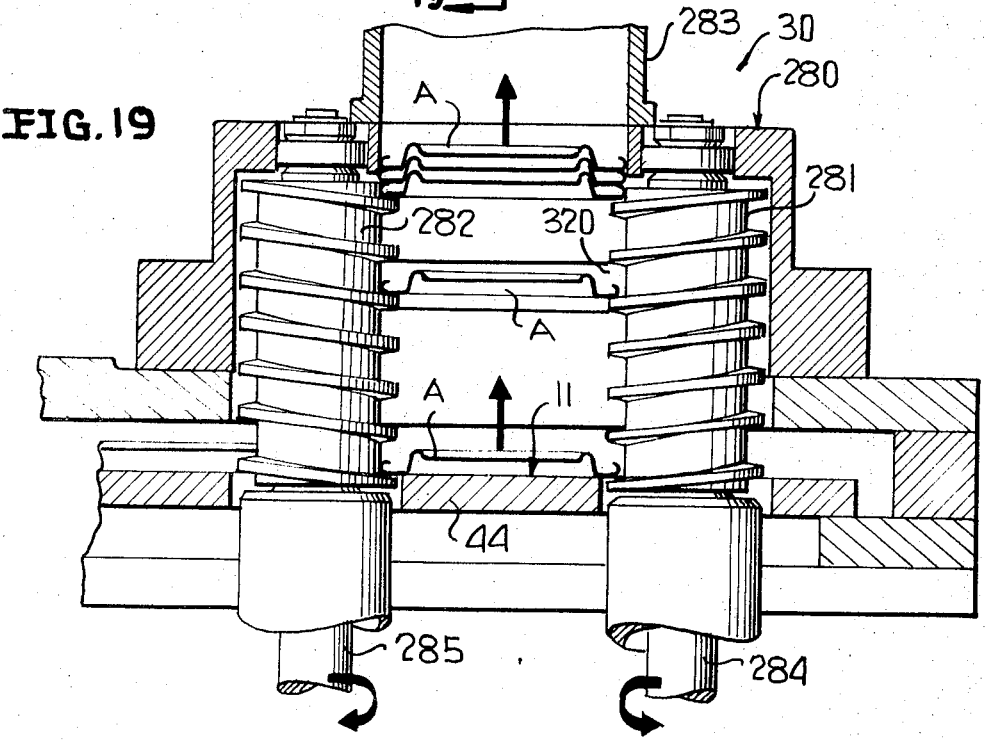
FIG. 19 is a fragmentary sectional view taken generally along line 19—19 of FIG. 18, and more clearly illustrates the manner in which a pair of screws perform the stacking operation.

As each article A is advanced to the discharge and restacking station 30 by the fingers 252 or 253 of the oscillating members 16, 17, respectively, the same are removed from the article path 11 by discharge means 280 (FIGS. 18 and 19) in the form of a pair of rotatable screws 281, 282 suitably journalled by bearings (not shown) in the frame 35. As each article A is delivered between the screws 281, 282 along the article path 11, the rotation of the screws elevates the individual articles and, apart from those which are ejected, the articles A are stacked in a tubular housing 283 conventionally supported above the article path 11.

The drive mechanism for the screws 281, 282 is best illustrated in FIG. 4 and includes a pair of rotatable shafts 284, 285 forming lower extensions of the respective screws 281, 282. The shafts 284, 285 include sprockets 286, 287 keyed thereto about which is entrained a timing chain 288. The timing chain 288 is also entrained about a timing sprocket 290 keyed to a shaft 291 suitably journalled in the framework 35 as well as an idler sprocket 292 likewise keyed to a shaft 293 journalled in the frame 35. The lower end portion of the shaft 291 also has keyed thereto a sprocket 294 about which is entrained a timing chain 295 which is also entrained about an idler sprocket 296 keyed to a shaft 297, another idler sprocket 298 keyed to a shaft 300 and a sprocket 301 keyed to the shaft 22. Another chain 302 is entrained about a sprocket 303 keyed to the shaft 22, an idler sprocket 304 fixed to a shaft 305 journalled in the frame 35 and a sprocket 306 keyed to the shaft 71 which is rotated during the energization of the motor 80 in the manner heretofore described. Thus, energization of the motor 80 imparts rotation to the sprockets 286, 287 over the power train heretofore described to rotate the shafts associated therewith thus imparting rotation to the threads or screws 281, 282 resulting in upward movement of the articles A in the manner best illustrated in FIGS. 18 and 19.

Those of the articles A found defective by the inspecting means 25, 26 due to either skips in the bands B1, B2 or clips in the curl C are ejected from the discharge station 30 prior to being stacked by the ejecting mechanism 31 when a time delayed signal is delivered to a solenoid operated valve 310 over respective conductors 311, 312. The solenoid operated valve 310 is coupled to a fluid motor 313 which is in fluid communication with a suitable source of pressurized air. The fluid motor 313 is mounted adjacent the discharge station 30 in a suitable manner and includes a piston rod 314 connected to an arm 315 (FIG. 5) pivotally connected at 316 to the frame 35. A nose 317 of the arm 315 projects through an opening 318 (FIG. 18) of the hopper housing 283 to contact a defective article A and push the same outwardly through a diametrically opposite opening 320 into a discharge chute 321. In this manner, any article A found to be defective is ejected into the chute 322 and only those articles which are commercially acceptable are stacked in the tubular hopper 283.

While preferred forms and arrangements of parts have been shown in illustrating the invention, it is to be clearly understood that various changes in details and arrangement of parts may be made without departing from the spirit and scope of this disclosure.

I claim:

1. An article conveying apparatus comprising means defining a generally circular path of article travel, means for serially feeding individual articles to said article path at a feed station thereof, means oscillating along said article path across said feed station for directing successive articles at said feed station in opposite directions along said article path, means for serially removing all individual articles from said article path at a single discharge station thereof, and means defining an article work station between said feed and discharge stations in both directions of article travel along said article path.

2. The article conveying apparatus as defined in claim 1 including additional means oscillating along said article path between said feed and discharge station in both directions of article travel along said article path for directing successive articles further toward said discharge station.

3. The article conveying apparatus as defined in claim 1 including additional means oscillating along said article path between said feed and discharge station in both directions of article travel along said article path for directing successive articles further toward said discharge station, and means for repetitiously and simultaneously moving said first-mentioned and additional oscillating means first in one direction of article travel along said article path and then in a second and opposite direction of article travel along said article path.

4. An article conveying apparatus comprising means defining a generally circular path of article travel, means for serially feeding individual articles to said article path at a feed station thereof, means oscillating along said article path across said feed station for directing successive articles at said feed station in opposite directions along said article path, means defining an article work station downstream of said feed station in both directions of article travel along said path to which individual articles are delivered by said oscillating means, and means for removing individual articles from and returning individual articles to said article path at said work stations.

5. The article conveying apparatus as defined in claim 4 including means for elevating individual articles from and lowering individual articles to said article path at said work station.

6. The article conveying apparatus as defined in claim 5 including means synchronizing the movement of said oscillating means for movement thereof toward each article work station only when the elevating and lowering means thereat is in its article-lowered position.

7. An article conveying apparatus comprising means defining a generally circular path of article travel, means for serially feeding individual articles to said article path at a feed station, means oscillating along said article path across said feed station for directing successive articles at said feed station in opposite directions along said article path, means defining an article work station downstream of said feed station in both directions of article travel along said article path to which individual articles are delivered by said oscillating means, and means for elevating individual articles from and lowering individual articles to said article path at said work stations.

8. An article conveying apparatus comprising means defining a generally circular path of article travel, means for serially feeding individual articles to said article path at a feed station thereof, means oscillating along said article path across said feed station for directing successive articles at said feed station in opposite directions along said article path, means for serially removing individual articles from said article path at a discharge station thereof, and additional means oscillating along said article path between said feed and discharge stations in both directions of article travel along said article path for directing successive articles further toward said discharge station.

9. The article conveying apparatus as defined in claim 8 including means for repetitiously and simultaneously moving said first-mentioned and additional oscillating means first in one direction of article travel along said article path and then in a second and opposite direction of article travel along said article path.

10. An article conveying apparatus comprising means defining a generally circular path of article travel, means for serially feeding individual articles to said article path at a feed station thereof, means oscillating along said article path across said feed station for directing successive articles at said feed station in opposite directions along said article path, means defining at least a pair of article work stations downstream of said feed station in both directions of article travel along said article path, said oscillating means being effective to direct individual articles from said feed station to a first of each of said pair of work stations, and additional means oscillating along said article path across each pair of work stations for delivering an article from each first work station to the second work station of the same pair while directing an article away from each second work station.

11. An article conveying apparatus comprising means defining a generally circular path of article travel, means for serially feeding individual articles to said article path at a feed station thereof, means oscillating along said article path across said feed station for directing successive articles at said feed station in opposite directions along said article path, means defining an article work station downstream of said feed station in both directions of article travel along said article path to which individual articles are delivered by said oscillating means, and means for rotating each article at each work station.

12. An article conveying apparatus comprising means defining a generally circular path of article travel, means for serially feeding individual articles to said article path at a feed station thereof, means oscillating along said article path across said feed station for directing successive articles at said feed station in opposite directions along said article path, means defining an article work station downstream of said feed station in both directions of article travel along said article path to which individual articles are delivered by said oscillating means, means for elevating individual articles from and lowering individual articles to said article path at said article work stations, and means synchronizing the movement of said oscillating means for movement thereof toward each article work station only when the elevating and lowering means thereat is in its article-lowered position.

13. An article conveying apparatus comprising means defining a generally circular path of article travel, means for serially feeding individual articles to said article path at a feed station thereof, means oscillating along said article path across said feed station for directing successive articles at said feed station in opposite directions along said article path, means defining at least an article work station and an article inspection station successively downstream of said feed station in both directions of article travel along said article path, means defining an article discharge station between said inspection stations, said oscillating means being effective to direct individual articles from said feed station to each of said work stations, and additional means for directing articles from each work station to and through each inspection station and to said discharge station.

14. An article conveying apparatus comprising means defining a generally circular path of article travel, means for serially feeding individual articles to said article path at a feed station thereof, means oscillating along said article path across said feed station for directing successive articles at said feed station in opposite directions along said article path, means defining at least an article work station and an article inspection station successively downstream of said feed station in both directions of article travel along said article path, means defining an article discharge station between said inspection stations, said oscillating means being effective to direct individual articles from said feed station to each of said work stations, additional means for directing articles from each work station to and through each inspection station and to said discharge station, means at said discharge station for removing articles from said article path and moving the same along another article path, means at each inspection station for generating an article-condition signal, and means responsive to said article-condition signal for removing the associated article from said another article path.

15. An article conveying apparatus comprising means defining a generally circular path of article travel, means for serially feeding individual articles to said article path at a feed station thereof, means oscillating along said article path across said feed station for directing successive articles at said feed station in opposite directions along said article path, means for serially removing individual articles from said article path at a discharge station thereof, means defining a first article work station between said feed and discharge stations in both directions of article travel along said article path to which individual articles are delivered by said oscillating means, means for elevating individual articles from and lowering individual articles to said article path at said work stations, means for rotating each article at each work station when at its elevated position, means defining a second article work station between each first article work station and said discharge station, and additional means oscillating along said article path across each of said first and second article work stations for delivering an article from each first work station to the second work station downstream therefrom while directing an article away from each second work station toward said discharge station.

16. The article conveying apparatus as defined in claim 15 including means synchronizing the movement of said first-mentioned oscillating means for movement thereof toward each first article work station only when the elevating and lowering means thereat is in its article-lowered position.

17. The article conveying apparatus as defined in claim 15 including means for elevating individual articles to said article path at each of said second article work stations, and means synchronizing the movement of said additional oscillating means for movement thereof across said first and second article work stations toward said discharge station only when the last-mentioned elevating and lowering means is in its article-lowered position.

18. The article conveying apparatus as defined in claim 16 including means for elevating individual articles to said article path at each of said second article work stations, and means synchronizing the movement of said additional oscillating means for movement thereof across said first and second article work stations toward said discharge station only when the last-mentioned elevating and lowering means is in its article-lowered position.

19. An article conveying apparatus comprising means defining a generally circular path of article travel, means for serially feeding individual articles to said article path at a feed station thereof, first means oscillating along said article path across said feed station for directing successive articles at said feed station in first and second opposite directions along said article path, first and second article work stations successively downstream of said feed station in both said first and second direction, said first oscillating means being operative for directing successive articles from said feed station to said first article work stations in alternating fashion, means for elevating articles in unison from sand lowering articles in unison to said article path at each of said first and second article work stations, second means oscillating along said article path across one of said pair of first and second article work stations for delivering an article from the first article work station of said one pair to the second article work station of said one pair downstream in said first direction while directing an article away from the second article work station of said one pair to said discharge station in said first direction, and third means oscillating along said article path across the other of said pair of first and second article work stations for delivering an article from the first article work station of said other pair to the second article work station of said other pair downstream in said second direction while directing an article away from the second work station of said other pair to said discharge station in said first direction.

20. The article conveying apparatus as defined in claim 19 including means synchronizing the movement of said second and third oscillating means for movement thereof across the associated pair of first and second article work stations only when the elevating and lowering means thereat is in its article-lowered position.

21. The article conveying apparatus as defined in claim 20 wherein said first, second and third oscillating means move in unison in said first and second directions.

22. The article conveying apparatus as defined in claim 19 wherein said first, second and third oscillating means move in unison in said first and second directions.

* * * * *